(12) United States Patent
Popp

(10) Patent No.: US 6,533,172 B1
(45) Date of Patent: Mar. 18, 2003

(54) PROPERTY SECURITY SYSTEM AND METHOD THEREFOR

(76) Inventor: Joseph B. Popp, 1133 Lincoln St., Hobart, IL (US) 46342-6039

( * ) Notice: Subject to any disclaimer, the term of this patent is extended or adjusted under 35 U.S.C. 154(b) by 21 days.

(21) Appl. No.: 09/685,630

(22) Filed: Oct. 9, 2000

(51) Int. Cl.$^7$ ................................................. G06F 5/00
(52) U.S. Cl. ........................................ 235/380; 235/375
(58) Field of Search ................................. 235/380, 375

(56) References Cited

U.S. PATENT DOCUMENTS

| | | | | |
|---|---|---|---|---|
| 4,408,215 A | * | 10/1983 | Kitchen | 101/DIG. 37 |
| 5,587,575 A | * | 12/1996 | Leitner et al. | 235/375 |
| 5,942,812 A | * | 8/1999 | Charrier et al. | 307/116 |
| 6,228,241 B1 | * | 5/2001 | Alwitt et al. | 205/105 |
| 6,259,367 B1 | * | 7/2001 | Klein | 235/375 |

FOREIGN PATENT DOCUMENTS

JP       02001114405 A   *  4/2001

* cited by examiner

Primary Examiner—Thien M. Le
Assistant Examiner—Allyson Sanders
(74) Attorney, Agent, or Firm—Emrich & Dithmar

(57) ABSTRACT

A property security system and method therefor assigns a property code uniquely associated with each property owning member. The property marker code includes a two letter abbreviation for the state of residence of the property owner and a numerical code identifying the county in a given state in which the member, or property owner, resides or is located. This aspect of the invention is based on the numerical ordering of all counties in each of the fifty states. The last portion of the alphanumeric property marker code is a number representing the order of membership in the property security system of the property owner registering his or her personal property. The property marking code may also include a number or letter code representing the client's country of residence or location. The property marking codes are maintained in a computerized system at a central location and are made available on a global information network to disseminate this property owner information on a worldwide basis to facilitate the return of lost or stolen property to the rightful owner. The property marking codes are permanently applied to an item of personal property by means of electroetching so as to uniquely identify the property owner.

17 Claims, 3 Drawing Sheets

PROPERTY SECURITY SYSTEM AND METHOD THEREFOR

FIELD OF THE INVENTION

This invention relates generally to security for items of personal property and is particularly directed to a system and method for assigning and recording an individual property owner code for each member, permanently marking each member's personal property items with this code, and storing all of the member codes in a computerized system connected to a global information network.

BACKGROUND OF THE INVENTION

A need exists for a centralized, universal system for maintaining ownership information for items of personal property. This need is particularly evident in business and industry, where expensive tools and machines essential to the operation of a business are subject to theft and conversion. Marking personal property with indicia identifying the owner is common. However, there is currently no available universal system for marking personal property items which uniquely identifies and, to a certain extent, locates the owner of the property. Moreover, there is currently no central clearing authority which issues indicia uniquely identifying the owner of an item of personal property and also records and stores this information in a manner which is easily accessible to anyone regardless of where that person resides or is located. Finally, a centralized personal property security registration system facilitates the transfer of ownership by using a single database which is easily updated and universally accessible to provide real time ownership information.

The present invention addresses the aforementioned limitations of the prior art by providing a personal property security system and method therefor which provides for the centralized recording and storage of ownership information relating to personal property items as well as to the permanent marking of ownership indicia on the item. Ownership indicia includes information relating to the state and county of residence or location of the owner, as well as a membership number in the personal property security system which uniquely identifies the property owner.

OBJECTS AND SUMMARY OF THE INVENTION

Accordingly, it is an object of the present invention to provide a system and method for marking personal property in a manner which uniquely identifies the property owner.

It is another object of the present invention to mark items of personal property in a manner which uniquely identifies the owner using a marking code which also identifies the state and county of residence or location of the owner.

Yet another object of the present invention is to provide a personal property marking code uniquely identifying the property owner as well as the property owner's state and county of residence or location which is recorded and stored at a central location and is available on a global information network.

This invention contemplates a system for identifying an owner of an item of personal property comprising: coded indicia uniquely identifying the owner, the coded indicia comprising: a first portion identifying a state of residence or location of the owner; a second portion identifying a county of resident or location of the owner; and a third portion assigning the owner a unique membership number in the system; a marker for applying the coded indicia to the item of personal property; a memory for storing the coded indicia at a central location for future reference; and a global information network coupled to the memory for making the coded indicia available on a worldwide basis.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
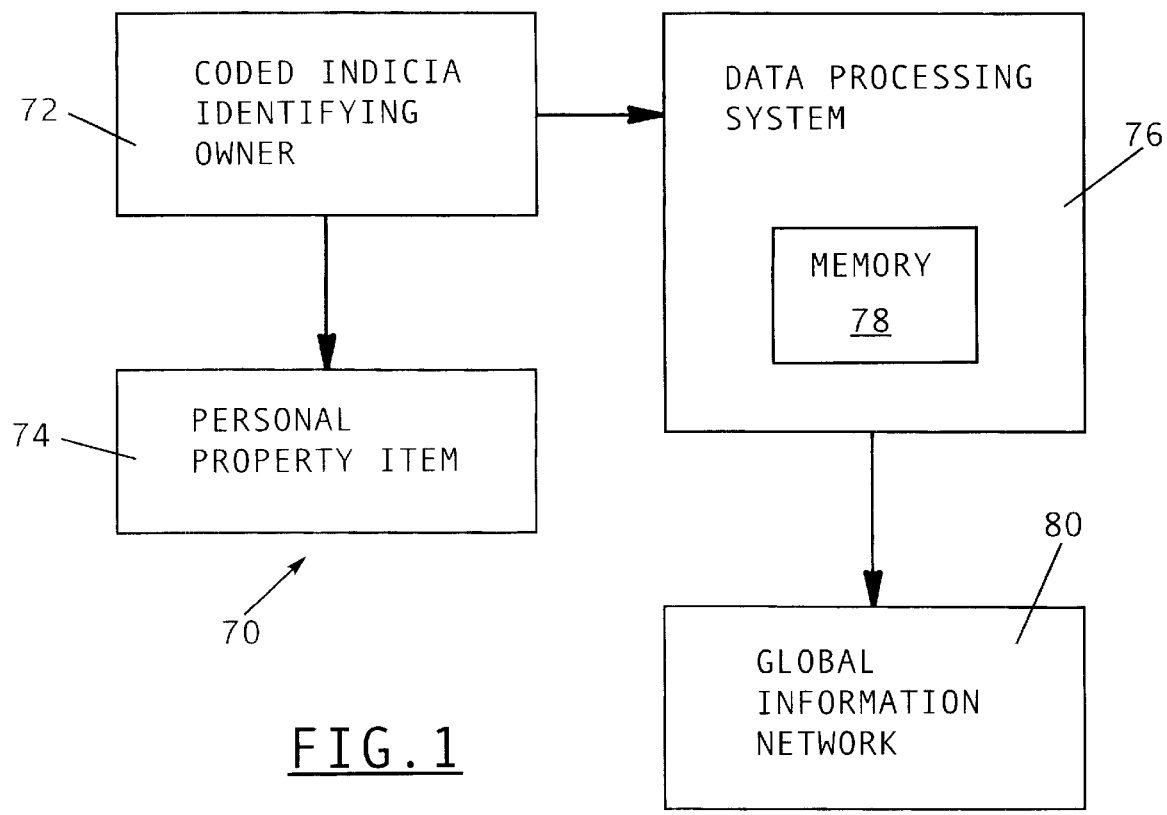
FIG. 1 is a simplified block diagram of a property security system in accordance with the principles of the present invention.

Referring to FIG. 1, there is shown a simplified block diagram of a property security system 70 in accordance with the principles of the present invention.

The property security system 70 makes use of coded indicia 72 identifying the owner of an item of personal property. This coded indicia in the subsequent discussion is also referred to as a "membership number" or "parts registration number", as these terms are used interchangeably below. The format and content of this coded indicia 72 is described in detail below. The coded indicia 72 associated with a respective personal property owner is affixed to a personal property item 74 in a manner which is also described in detail below. The coded indicia 72 for the items of personal property associated with each personal property owner is provided, or input to, a data processing system 76. The data processing system 76 includes, among other things, a memory 78 for storing the coded indicia 72 for the items of personal property of each personal property owner. There are many methods which could be used for affixing the coded indicia 72 to a personal property item 74, with a preferred embodiment of the present invention employing electrochemical marking as described in detail below. Data processing system 76 may be conventional in design and operation and is preferably disposed at a central location. Memory 78 in which personal property owner identification as well as the coded indicia associated with each individual personal property owner is stored is also of conventional design and operation. Memory 78 would typically be in the form of a random access memory (RAM) which allows for the entry and update of ownership data stored in the memory. Data processing system 76 is connected to a global information network 80, such as the Internet, to allow for universal accessing of the property owner information and coded indicia stored in the data processing system's memory 78. This permits individuals as well as various organizations such as law enforcement agencies around the world, to check the property owner information and coded indicia stored in the data processing system's memory 78 to determine or verify ownership of a given item of personal property. By centrally storing this information and making it available on a universal basis, property ownership determinations can be accomplished faster, more easily and more reliably than heretofore available.

Figure 2:
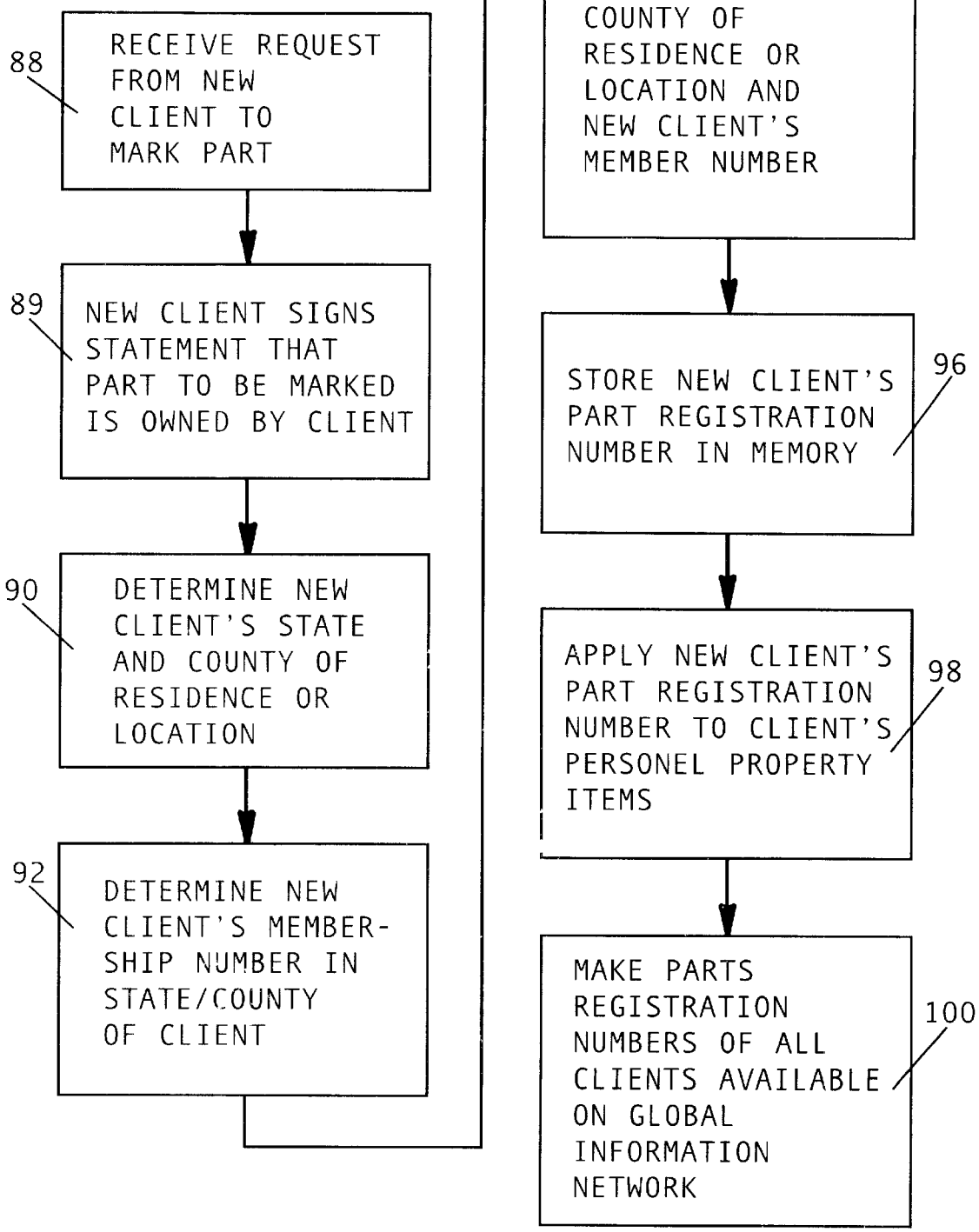
FIG. 2 is a simplified flow chart illustrating the sequence of steps involved in carrying out the property security system and method of the present invention.

Referring to FIG. 2, there is shown a simplified flow chart illustrating the series of steps involved in carrying out a property security system method in accordance with the principles of the present invention. At step 88, a request is received from a new client, or member, to mark an item for personal property, such as a part, with coded indicia uniquely identifying the client. The coded indicia is comprised of a combination of alphanumeric characters identifying the state and county of residence or location of the client, as well as the order in which the client enters, or becomes a member of, the property security system relative to other clients residing in the same state and county. For example, the first two characters of the coded indicia are comprised of a two letter abbreviation of the state in which the new client resides or is located. More specifically, the first two characters of coded indicia for an Indiana resident are "IN", while the first two characters for an Illinois residence are"IL". The next two characters in the coded indicia are in the form of a number representing the county of residence or location of the new client in a given state. All states make use of a numerical system for designating each county within that state. An example of a numerical listing employed by the state of Indiana for counties in that state is shown in Table I. For example, the first four characters in the coded indicia for a resident of Porter County in Indiana would be "IN-64". Finally, a last set of characters in the coded indicia identifies the new client in terms of the order in which the new client became a registered member of the property security system, i.e., had his or her coded indicia stored in the data processing system's memory 78. Thus, a complete coded indicia for a new client residing in Porter County, Indiana might be represented as "IN-64-201", where the number 201 indicates that the client is the two hundred and first client among clients residing or located in Porter County, Indiana to become a member of the property security system.

TABLE I

1. ADAMS
2. ALLEN
3. BARTHOLOMEW
4. BENTON
5. BLACKFORD
6. BOONE
7. BROWN
8. CARROLL
9. CASS
10. CLARK
11. CLAY
12. CLINTON
13. CRAWFORD
14. DAVIESS
15. DEARBORN
16. DECATUR
17. DEKALB

TABLE I-continued

18. DELAWARE
19. DUBOIS
20. ELKHART
21. FAYETTE
22. FLOYD
23. FOUNTAIN
24. FRANKLIN
25. FULTON
26. GIBSON
27. GRANT
28. GREENE
29. HAMILTON
30. HANCOCK
31. HARRISON
32. HENDRICKS
33. HENRY
34. HOWARD
35. HUNTINGTON
36. JACKSON
37. JASPER
38. JAY
39. JEFFERSON
40. JENNINGS
41. JOHNSON
42. KNOX
43. KOSCIUSKO
44. LAGRANGE
45. LAKE
46. LAPORTE
47. LAWRENCE
48. MADISON
49. MARION
50. MARSHALL
51. MARTIN
52. MIAMI
53. MONROE
54. MONTGOMERY
55. MORGAN
56. NEWTON
57. NOBLE
58. OHIO
59. ORANGE
60. OWEN
61. PARKE
62. PERRY
63. PIKE
64. PORTER
65. POSEY
66. PULASKI
67. PUTNAM
68. RANDOLPH
69. RIPLEY
70. RUSH
71. ST. JOSEPH
72. SCOTT
73. SHELBY
74. SPENCER
75. STARKE
76. STEUBEN
77. SULLIVAN
78. SWITZERLAND
79. TIPPECANOE
80. TIPTON
81. UNION
82. VANDERBURGH
83. VERMILLION
84. VIGO
85. WABASH
86. WARREN
87. WARRICK
88. WASHINGTON
89. WAYNE
90. WELLS
91. WHITE
92. WHITELY

After a request is received from a prospective new client to mark a part at step 88, the next step 89 involves the new client signing a statement to the effect that the part to be marked is the property of the client. This statement would also preferably include the new client's individual assigned registration number determined as described in detail below and would preferably be made under oath in the form of an affidavit before a notary public or other person of authority. The next step in the inventive process is to determine the new client's state and county of residence or location at step 90. After the new client's state and county of residence or location is determined, the next step is to determine the new client's membership number in the new client's state and county at step 92. For example, if the client is the $201^{st}$ member of the property security system, of those members residing or located in Porter County, Indiana, the new client would be assigned the number "201" as a portion of his or her coded indicia. A part registration number based on the client's state and county of residence or location as well as the client's membership number is then assigned to the new client at step 94. The new client's membership number is then stored in the data processing system's memory at step 96 and the membership numbers of all clients are then made available on a global information network at step 98. Finally, at step 100 the new client's membership number is applied or affixed to the client's personal property items. This facilitates the identification of the owner of items of personal property on a universal basis and provides access to such information to various organizations, including law enforcement agencies.

Figure 3:
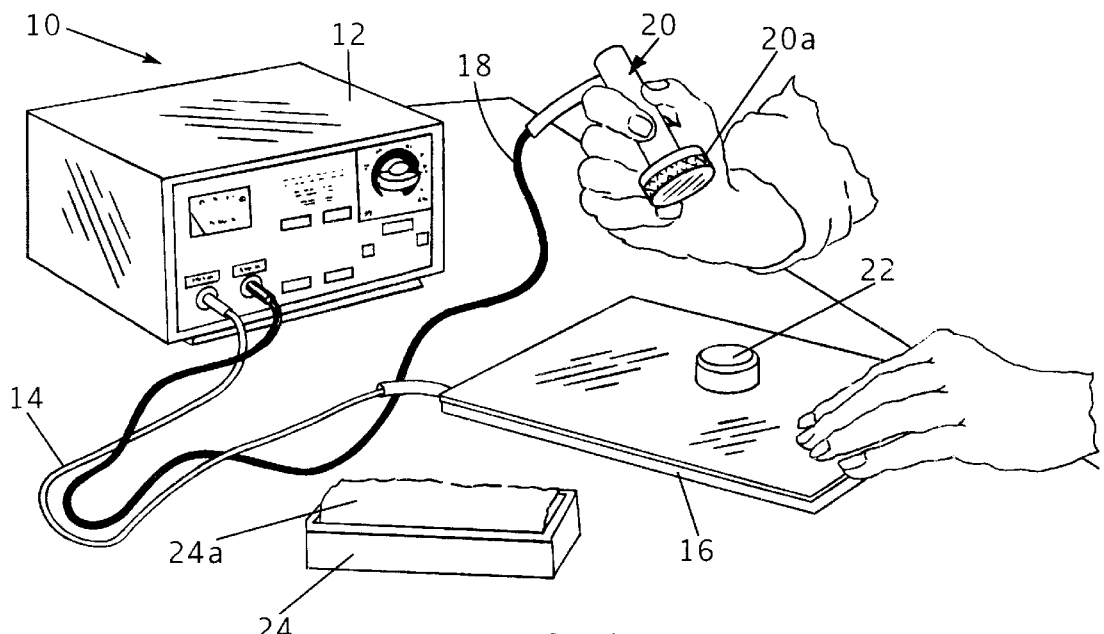
FIG. 3 is a perspective view of an arrangement for applying coded indicia to a personal property item in accordance with one aspect of the present invention, where the coded indicia identifies the owner of the item.

Referring to FIG. 3, there is shown a simplified perspective view of an arrangement for marking personal property items in accordance with one aspect of the present invention. Shown in FIG. 3 is an electroetching system 10 for use in marking personal property items. The electroetching system 10 includes a power supply 12 with first and second power cords 14 and 18 electrically coupled thereto. Electroetching system 10 further includes a ground plate 16 and a marker 20. Ground plate 16 is coupled to the power supply 12 by means of the first power cord 14, while marker 12 is coupled to the power supply by means of the second power cord 18. Marker 20 is grasped and moved by the hand of a user as shown in the figure. Marker 20 serves as the cathode in the electrical circuit, while a part to be marked 22 disposed on the ground plate 16 serves as the circuit's anode. Electroetching system 10 further includes an electrolyte reservoir 24 and a reservoir wick 24a disposed on or in the reservoir. Reservoir 24 contains an electrolyte in the form of metallic salts. The passage of a direct current (DC) from the part 22 to be marked (anode) through an electrolyte disposed on the marker's wick 20a to the part being marked results in metallic ions moving toward the negatively charged marker 20. As metal is deposited from the solution onto the cathode, metal is dissolved from the anode. By masking the anode, metal is dissolved only from the exposed area as described in the following paragraphs.

Figure 4:
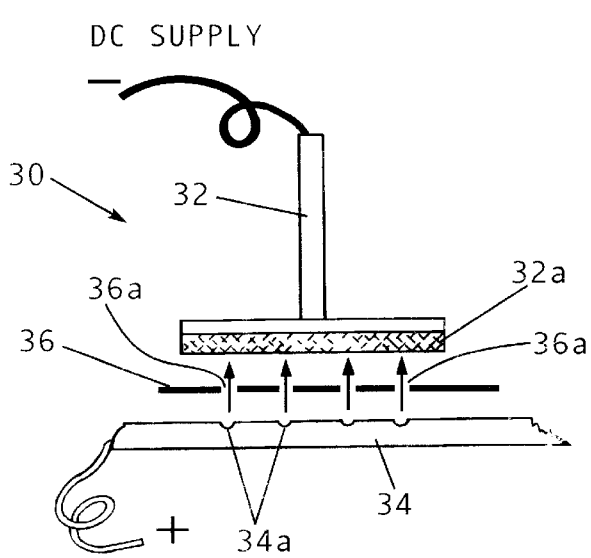
FIG. 4 is a side elevation view of a portion of the property marking arrangement shown in FIG. 3 involving the use of a DC voltage.

Referring to FIG. 4, there is shown a simplified side elevation view of a DC etching arrangement 30 with a stencil 36. The DC etching arrangement 30 further includes a DC supply (not shown for simplicity) having a negative terminal to which is connected a marker 32 having an electrolyte-soaked pad 32a. The DC etching arrangement 30 also includes the item 34 to be marked which is metal and is connected to the positive terminal of the. DC supply and thus serves as the anode. When a DC voltage is applied between marker 32 and the item 34 to be marked, a low voltage current passes through the apertures 36a in stencil 36 via the electrolyte disposed on the pad 32a of marker 32. This low voltage current passing through the apertures 36a in stencil 36 etches away a portion of the metal on the surface of the item 34 to be marked in accordance with the design contained in the stencil so as to form etched marks 34a in the item. These etched marks 34a are in the form of the previously described coded indicia forming the client's membership number.

Figure 5:
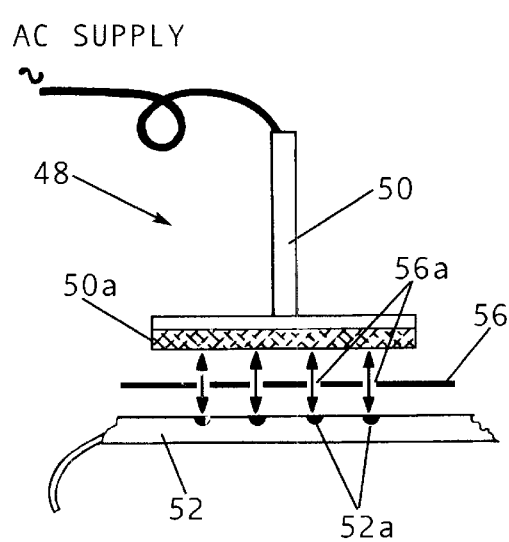
FIG. 5 is a side elevation view of still another embodiment of a personal property marking arrangement in accordance with the present invention incorporating an AC voltage source.

Referring to FIG. 5, there is shown a simplified side elevation view of an AC etching arrangement 48 in accordance with another embodiment of the present invention. In the AC etching arrangement 48, an AC voltage source (also not shown for simplicity) is applied between a marker electrode 50 and the item 52 to be marked. Disposed on the end of the marker electrode 50 is an electrolyte-soaked pad 50a. Disposed between the marker electrode 50 and the item 52 to be marked is a stencil 56 having plural spaced apertures 56a therein. The shape of the spaced apertures 56a in the stencil 56 defines the coded indicia of a given member of the property security system which is affixed to the personal property of the member. An AC voltage source applied across the marker electrode 50 and the item 52 to be marked causes dark (black) metal oxides to be redeposited on the surface of the item in the shape or form of the spaced apertures 56a in stencil 56. In applying an AC voltage source between marker electrode 50 and item 52 to be marked, metal is etched from the surface of the item during one half cycle and a stable compound of the base metal (electrolyte) is redeposited in the etched away portions of the surface of the item.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A system for identifying an owner of an item of personal property comprising:

coded indicia uniquely identifying the owner, said coded indicia comprising:

a first portion identifying a state of residence or location of the owner;

a second portion identifying a county of residence or location of the owner; and a third portion assigning the owner a unique membership number in the system, wherein the third portion of said coded indicia is a number representing a sequential order associated with when the owner became a member of said system for identifying an owner of an item of personal property;

marking means for applying said coded indicia to the item of personal property;

memory means for storing said coded indicia at a central location for future reference; and a global information network coupled to said memory means for making said coded indicia available on a worldwide basis.

2. The system of claim 1 wherein the first portion of said coded indicia is an abbreviation of the state of residence or location of the owner.

3. The system of claim 2 wherein the second portion of said coded indicia is a number identifying a county of residence or location of the owner.

4. The system of claim 1 wherein said coded indicia is comprised of alphanumeric characters.

5. The system of claim 1 wherein said marking means comprises electrochemical marking apparatus.

6. The system of claim 5 wherein said electrochemical marking apparatus includes an electroetching marker and a charged metal plate and wherein the item of personal property is disposed on said metal plate and is placed in electrical contact with said electroetching marker.

7. The system of claim 6 wherein an apertured stencil is disposed intermediate said electroetching marker and the item of personal property.

8. The system of claim 7 further comprising a DC voltage source coupled to said electroetching marker and said metal plate.

9. The system of claim 7 further comprising an AC voltage source coupled to said electroetching marking and said metal plate.

10. A method for recording ownership information of personal property items and distributing said ownership information to facilitate recovery of lost or stolen personal property items by the owner, said method comprising the steps of:

assigning coded indicia to a personal property owner by providing a first portion of said coded indicia in accordance with a state of residence or location of the owner, a second portion of said coded indicia in accordance with a county of residence or location of the owner, and a third portion of said coded indicia in accordance with the sequential order in which the owner's coded indicia is assigned relative to other personal property owners;

affixing said coded indicia to personal property items of the owner;

storing plural coded indicia for plural personal property owners in a memory at a central location, wherein each coded indicia uniquely identifies each of said personal property owners; and providing said plural coded indicia on a global information network for making said plural coded indicia available on a worldwide basis.

11. The method of claim 10 wherein the step of providing a first portion of said coded indicia includes assigning a two letter abbreviation for the state of residence or location of the personal property owner.

12. The method of claim 11 wherein the step of providing a second portion of said coded indicia includes assigning a number identifying a county of residence or location of the owner.

13. The method claim 10 wherein the step of affixing said coded indicia includes electroetching said coded indicia on personal property items of the owner.

14. The method of claim 13 wherein the step of affixing said coded indicia further includes positioning a stencil containing an aperture pattern in accordance with said coded indicia adjacent a personal property item to be marked.

15. The method of claim 14 wherein the step of affixing said coded indicia includes DC electroetching said coded indicia on personal property items of the owner.

16. The method of claim 14 wherein the step of affixing said coded indicia includes AC electroetching said coded indicia on personal property items of the owner.

17. The method of claim 10 further comprising the step of obtaining prior to affixing said coded indicia to the personal property items a written statement from the owner that the personal property items are the property of the owner.

* * * * *